United States Patent [19]
Folino

[11] Patent Number: 5,114,247
[45] Date of Patent: May 19, 1992

[54] MULTI-ELEMENT BEARINGS

[75] Inventor: Frank A. Folino, Weston, Mass.

[73] Assignee: Massachusetts Institute of Technology, Cambridge, Mass.

[21] Appl. No.: 625,760

[22] Filed: Dec. 10, 1990

Related U.S. Application Data

[62] Division of Ser. No. 370,805, Jun. 20, 1989, abandoned.

[51] Int. Cl.⁵ .................. F16C 19/49; F16C 19/56
[52] U.S. Cl. ................................. 384/461; 384/445
[58] Field of Search .................. 384/19, 48–50, 384/56, 58, 445, 452, 454, 456, 490, 494, 499, 502, 505, 520, 525, 520, 522, 542, 548, 551, 552, 565, 567, 571, 627, 461

[56] References Cited

U.S. PATENT DOCUMENTS

| | | | |
|---|---|---|---|
| 1,210,516 | 1/1917 | Morris | 284/500 |
| 1,342,541 | 6/1920 | Johnson | 384/566 |
| 1,687,756 | 10/1928 | Foley | 384/461 X |
| 3,128,134 | 4/1964 | Dorl | 384/454 |
| 3,464,744 | 9/1969 | Fall | 384/19 |
| 3,689,127 | 9/1972 | Hampp | 384/568 |

FOREIGN PATENT DOCUMENTS

| | | | |
|---|---|---|---|
| 408149 | 1/1925 | Fed. Rep. of Germany | 384/520 |
| 574124 | 7/1924 | France | 384/520 |
| 1083678 | 1/1955 | France | 384/452 |
| 308090 | 2/1937 | Italy | 384/490 |
| 59-29817 | 2/1984 | Japan | 384/461 |

OTHER PUBLICATIONS

Keene Corporation, Kaydon Bearing Division, Catalog 300, Capacity Life and Load Analysis (1969), pp. 14–17.
American National Standard, AFBMA Standard (1979).
Hoffman et al., "Motor Vehicle Wheel Bearing Mountings, Actual Solutions for the Large Series Preduction", Ball and Roller Engineering, 1983-2/1984-1, pp. 20–26.

Primary Examiner—Daniel P. Stodola
Assistant Examiner—William G. Battista, Jr.
Attorney, Agent, or Firm—Fish & Richardson

[57] ABSTRACT

A compound bearing element having a first rolling element with a second rolling element superimposed over the first rolling elements; a compound bearing element assembly having a first race, a second race and a plurality of compound bearing elements; a compound bearing element assembly having a third rolling element superimposed over a second rolling element; and a bearing assembly having a first race; a second race which includes a set portion and a securing portion, and a plurality of bearing elements.

8 Claims, 6 Drawing Sheets

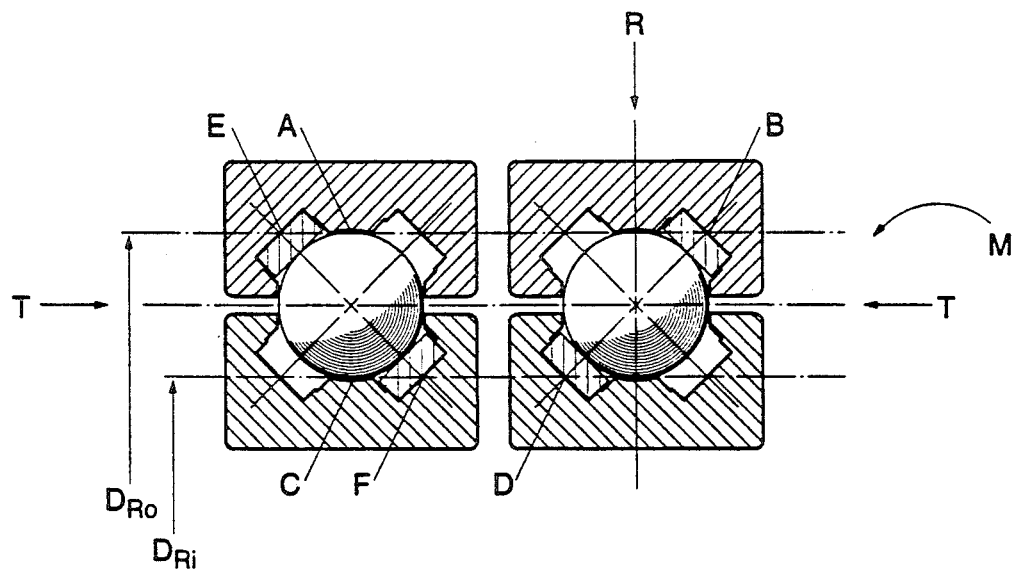
FIG: 10A   FIG: 10B
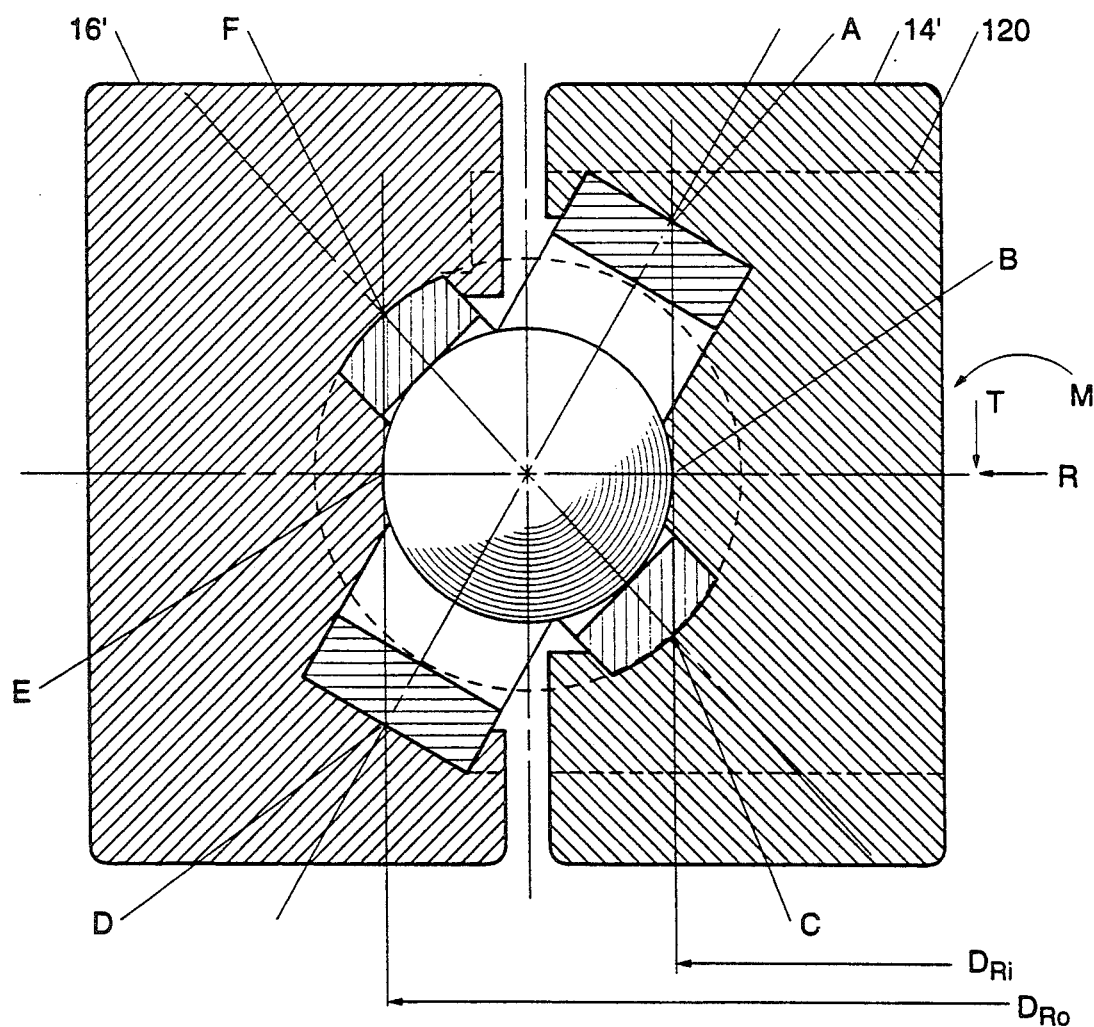
FIG: 11

MULTI-ELEMENT BEARINGS

This is a divisional of copending application Ser. No. 07/370,805 filed on Jun. 20, 1989, now abandoned.

BACKGROUND OF THE INVENTION

The present invention relates to bearings.

It is known that by the rolling action of spherical balls and/or cylindrical rollers in bearings, loads or combinations of loads may be efficiently transmitted from a rotating member to a stationary structure or from one rotating member to another. Bearings containing balls and/or rollers may be configured to accommodate the nature of radial, thrust and moment loads. However, bearings designed to accommodate only pure radial or thrust loads cannot by themselves effectively accommodate a combination of these loads. Moreover, under the influence of moment loading, these bearings are inefficient because they cannot, by themselves, apply a moment reaction to accommodate the moment loading without downgrading the useful life of the bearing.

Angular contact bearings (ball or roller type) can accommodate radial, thrust, and moment loads by using two such bearings either together or separated some distance.

A single row ball bearing using four points of contact at crossed contact angles between the balls and the races can accommodate combinations of radial, thrust and moment loading. The loading imposed on these bearings is very high, and the loading capability of the bearing is reduced, because the highest loaded ball is required to react the combined external loading of radial, thrust and moment loads. Additionally, true rolling of the bearings cannot occur because three or four points of contact between the balls and the race are required to react the combined external loading. This will result in skidding of the balls.

The fatigue life of a ball bearing with point contact at the races is estimated as follows:

$$L = (Q_c/Q)^3$$

where:
L = fatigue life in millions of revolutions;
$Q_c$ = dynamic capacity of the bearing; and
Q = externally applied loads or combination of loads.

The fatigue life of a cylindrical roller bearing with line contact at the races is estimated as follows:

$$L = (Q_c/Q)^4$$

It follows that with a ball bearing and roller bearing of equal dynamic capacity ($Q_c$), when exposed to the same externally applied load, the roller bearing achieves a longer life. Accordingly, for a ratio of:

$$(Q_c/Q) = 3$$

a ball bearing's estimated life is 27,000,000 revolutions and a roller bearing's estimated life is 81,000,000 revolutions. Thus, the roller bearing achieves three times the life of the ball bearing.

SUMMARY OF THE INVENTION

It has been discovered that providing a first rolling element with a second rolling element superimposed over the first rolling element advantageously provides a compound bearing element which resists radial, thrust and moment loads.

The above invention may include any of the following features: one of the rolling elements carries a first load and the other rolling element carries a second load; the first load includes a radial load; the second load includes a thrust load; the first rolling element and the second rolling element each carry a portion of a third load; the third load includes a moment load; the first rolling element is a ball; the second rolling element is a roller; the roller alternately includes an outer surface which is outwardly rounded, an outer surface which is flat, or an outer surface which is inwardly tapered; and, the first rolling element and the second rolling element rotate at substantially equal angular velocities.

In another aspect the invention includes a third rolling element which is superimposed over the second rolling element. In this aspect each rolling element may be configured to carry a load.

In another aspect, the invention includes a bearing assembly including a first race, a second race, and a plurality of compound bearing elements rotatably positioned between the first race and the second race, each compound bearing element including a first rolling element with a second rolling element superimposed over the first rolling element.

The above aspect may include any of the following features: one of the rolling elements carrying a first load and the other of the rolling elements carrying a second load; a plurality of (second), bearing elements being alternately positioned around the compound bearing elements; every fourth position of a bearing element is a compound bearing element; the plurality of compound bearing elements are contiguous to each other; and, the bearing assembly further includes another group of compound bearing elements that are contiguous to each other.

In another aspect, the invention includes a bearing assembly including a first race, a second race which includes a set portion and a securing portion, and a plurality of bearing elements that are placed between a first race and the set portion such that, after the bearing elements are placed between the first race and the set portion, the securing portion is placed over the bearing elements and the set portion.

The above invention may include the following features: the securing portion is secured to the set portion by a plurality of threaded members; and the securing portion is configured to threadedly mate with the set portion.

DESCRIPTION OF THE PREFERRED EMBODIMENT

We first briefly describe the drawings.

FIGS. 10A and 10B show another alternate compound bearing assembly.

FIG. 11 shows another alternate compound bearing assembly.

STRUCTURE

Figure 1:
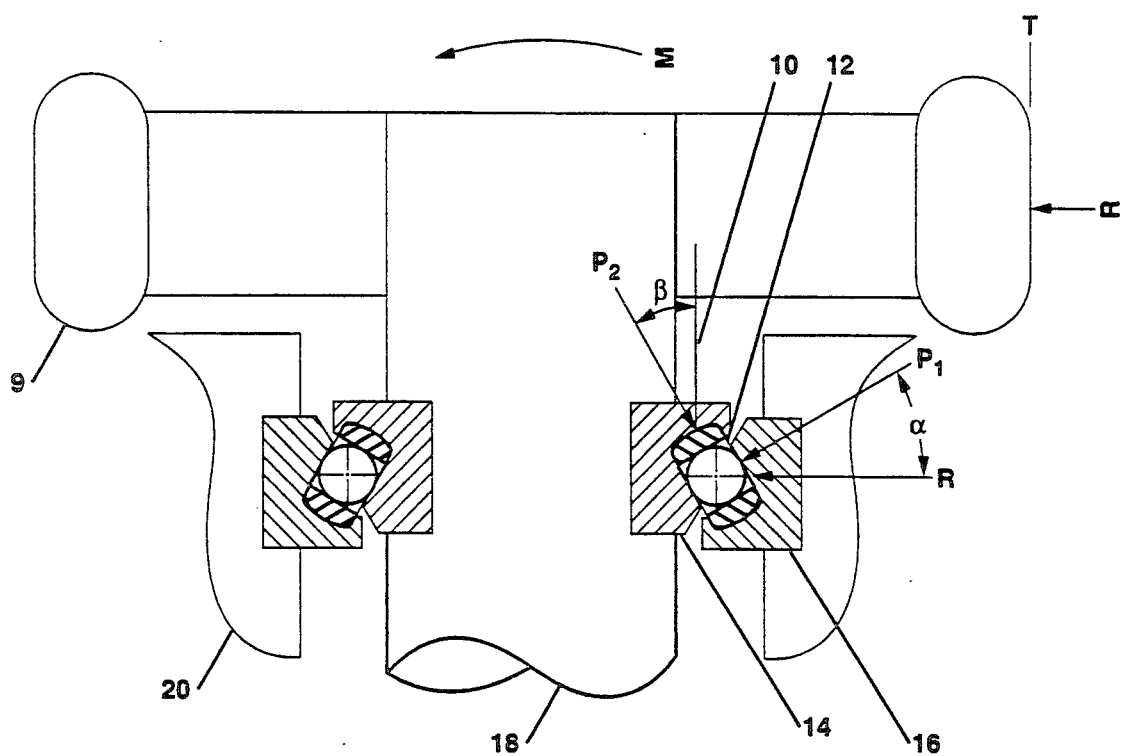
FIG. 1 shows a vehicle wheel assembly utilizing an assembly of compound bearing elements according to the invention.

Referring to FIG. 1, vehicle wheel asembly 9 is one example of an assembly which utilizes bearing assembly 10 which includes a plurality of four-point-contact, two-rolling-element bearing elements 12 (hereinafter referred to as compound bearing elements). Compound bearing elements 12 are located between inner rotating race element 14 and outer fixed race element 16. Rotating race element 14 is attached to wheel axle assembly 18 and fixed race element 16 is attached to body 20.

Figure 2:
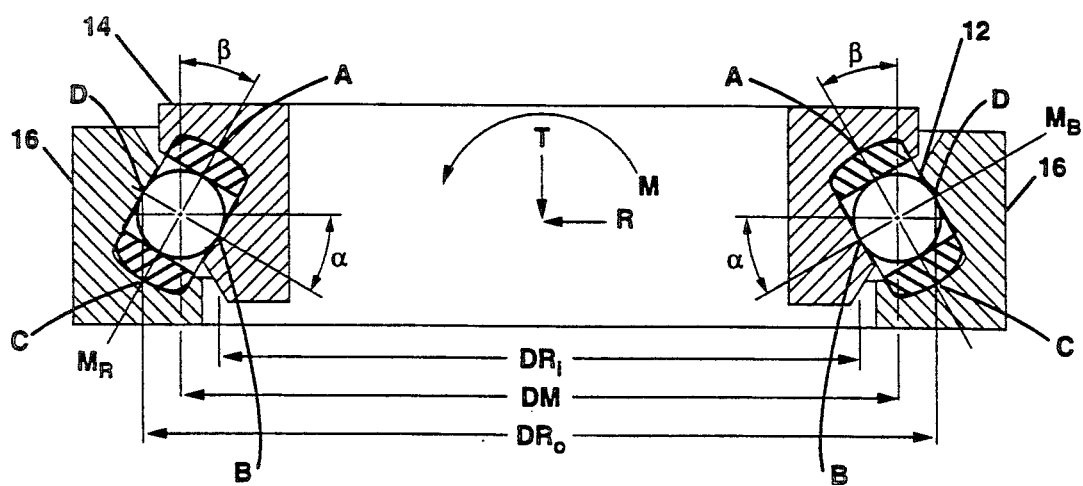
FIG. 2 shows the compound bearing assembly of FIG. 1 in greater detail.

Referring to FIG. 2, bearing assembly 10 has a bearing pitch diameter, $D_M$, as well as a ball/roller outer race pitch diameter, $DR_o$, and a ball/roller inner race pitch diameter, $DR_i$. Bearing element 12 contacts race elements 14, 16 at a roller contact angle $\beta$ and a ball contact angle $\alpha$. (A, B, C and D are contact points.)

Figure 3:
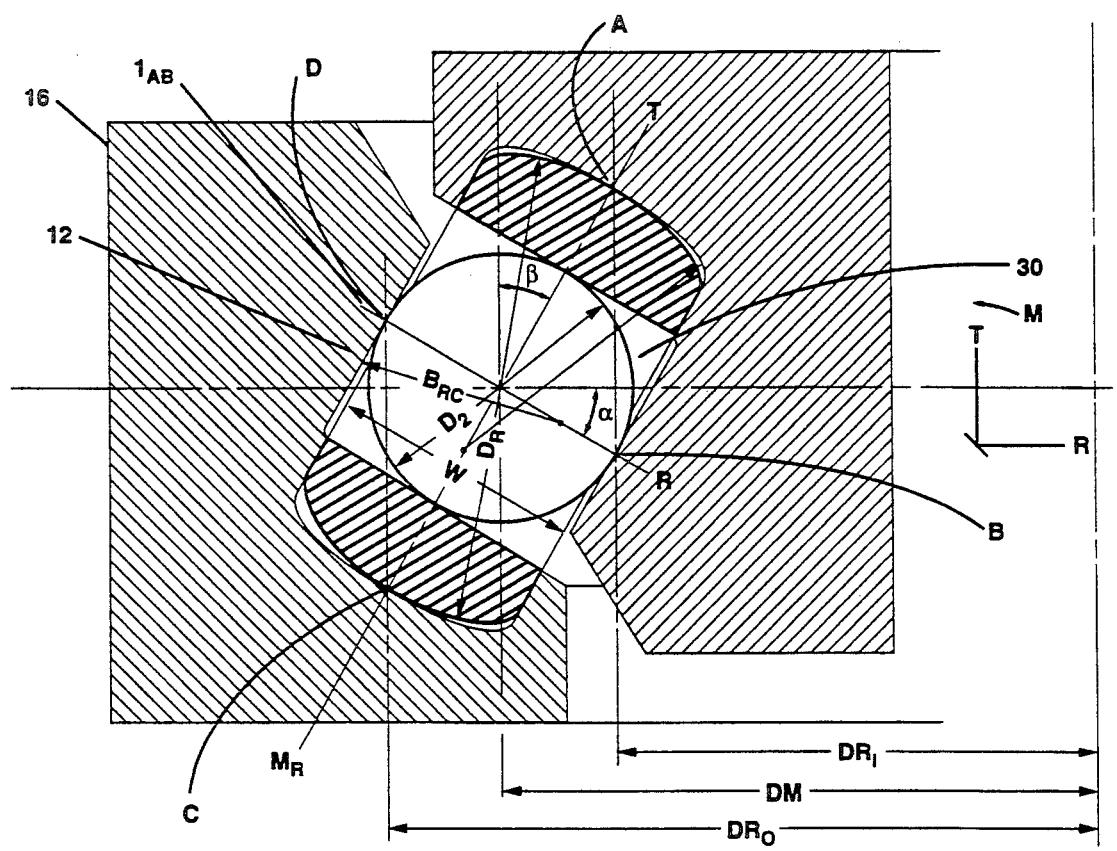
FIG. 3 shows an enlarged view of a compound bearing element of FIG. 2.

Referring to FIG. 3, compound bearing element 12 includes ball 30 and roller 32, with ball diameter, $D_B$, roller diameter $D_R$ and roller thickness, W. Races 14, 16 have a ball race curvature, $B_{RC}$, and a roller race curvature, $R_{RC}$, where, $$B_{RC} > D_B,$$

and $$R_{RC} > D_R.$$

Accordingly, compound bearing element 12 contacts races 14, 16 at four contact points A, B, C and D. Contact points A and B contact inner race 14 at diameter $D_{Ri}$ and contact points C and D contact outer race 16 at diameter $D_{RO}$. This configuration allows under certain conditions, ball 30 and roller 32 to rotate at the same angular velocity about the bearing center. More specifically, the proper relationship of contact angles $\alpha$ and $\beta$ and of diameters $D_B$ and $D_R$ allows the peripheral velocity of the ball center, $V_{EB}$, to equal the peripheral velocity of the roller center, $V_{ER}$.

More specifically, when $$(D_R/D_B) = \cos \alpha / \sin \beta,$$

$$V_{EB} = V_{ER}.$$

Under these conditions, the kinematics of the compound bearing element are satisfied and true rolling action of balls 30 and rollers 32 occurs because neither element impedes the velocity of the other and thus there is no skidding between elements. This applies for any loading condition.

Figure 4:
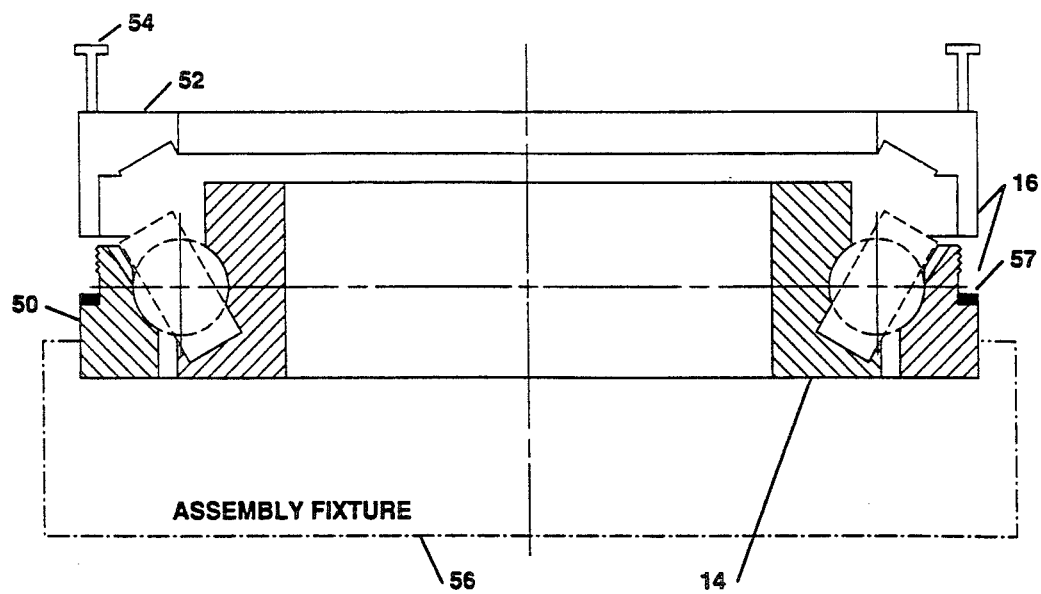
FIG. 4 shows an alternate bearing assembly of FIG. 1 partially assembled.

Referring to FIG. 4, in a preferred embodiment; bearing assembly 10 includes inner race 14, set portion 50 and securing portion 52, set portion 50 and securing portion 52 combining to form outer race 16. During assembly, inner race 14 and set portion 50 are held in position by assembly fixture 56, bearing elements (e.g., compound bearing elements 12) are placed, either serially or parallel, between inner race 14 and set portion 50, and securing portion 52 is placed over set portion 50 and the compound bearing elements. After assembly, a plurality of threaded members 54 secure set portion 50 to securing portion 52. Shims 57 may be located between structure 50, 52. A single shim 57 may be constructed of a plurality of pieces.

OPERATION

Referring to FIG. 1, bearing assembly 10 allows axle 18 to rotate relative to body 20. Compound bearing element 12 enables a single row bearing assembly 10 to accommodate radial (R), thrust (T) and moment (M) loading. Radial loads are carried across ball 30 providing the equivalent radial load $P_1$. Thrust loads are carried across roller 32 providing the equivalent thrust load $P_2$.

Referring to FIGS. 2 and 3, compound bearing element 12 is configured such that ball 30 carries radial loads and roller 32 carries thrust loads. When moment loads are applied, they are reacted by both ball 30 and roller 32. The external moment load is accommodated with a coupling reaction that includes a moment component $M_R$ across the roller 32 at any position and a moment component $M_B$ across ball 30 180° away from the element which carries $M_R$. This separation of loading results in a reduction of the load on a bearing element which advantageously allows either the use of a smaller capacity compound bearing element or the compound bearing element to have a longer rating life.

Referring to FIGS. 3 and 4, when assembling compound bearing assembly 10, bearing elements (e.g., compound bearing elements 12) are placed between inner race 14 and set portion 50 of outer race 16. After compound bearing elements 12 are in place, securing portion 52 is attached to set portion 50 by threaded members 54. Shim 57, which was between set portion 50 and securing portion 52 when races 14, 16 were fabricated, may be placed between set portion 50 and securing portion 52 to allow the distance between contact points A and B to be adjusted to be equal or slightly less than the distance between contact points C and D. Threaded members 54 are torqued so that there is no clearance between shim 57 and set and securing portions 50, 52. The thickness of shim 57 may be adjusted to compensate for manufacturing allowances. Additionally, bearing elements 12 may be preloaded by further adjusting the thickness of shim 57. Such preloading allows more precise operation by minimizing deflection due to application of a load. Additionally, rather than using threaded members 54 to attach set portion 50 to securing portion 52, set portion 50 may be configured to threadedly mate with securing portion 52.

OTHER EMBODIMENTS

Figure 5:
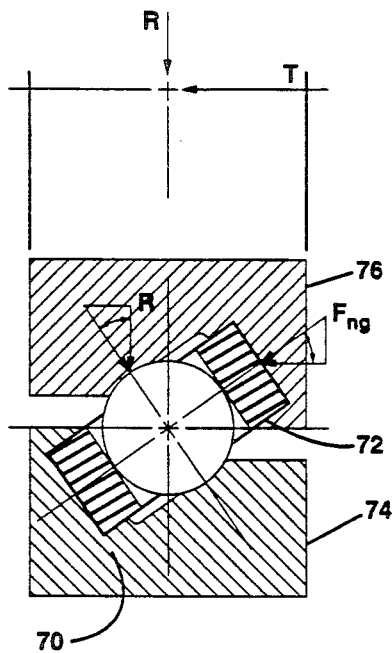
FIGS. 5 and 6 show enlarged views of a alternate compound bearing elements.

FIG. 5 shows compound bearing element 70 having cylindrical roller 72 which has a line contact with races 74, 76. With compound bearing element 70, the resulting thrust load $F_{na}$ at the center of roller 72 is the sum of the average radial load across the entire flat surface of roller 72. This line contact has the advantage of providing more contact area under load and therefore more load carrying capacity than a ball of equal size having point contact.

Figure 6:
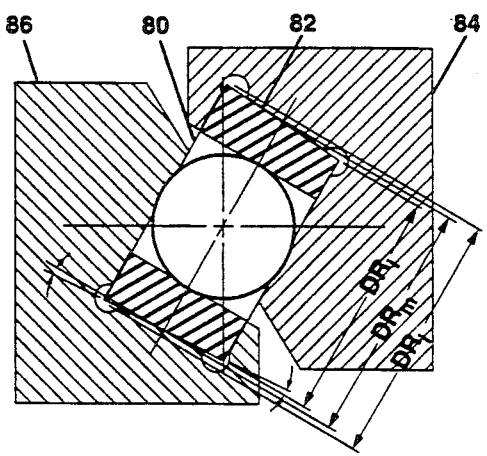

FIG. 6 shows compound bearing element 80 having tapered roller 82 that mates with races 84, 86. Races 84, 86 have indentations at the corners of roller 82 to provide better wear characteristics. The tapered roller surface allows roller 82 to roll with less tendency to skew.

Figure 7:
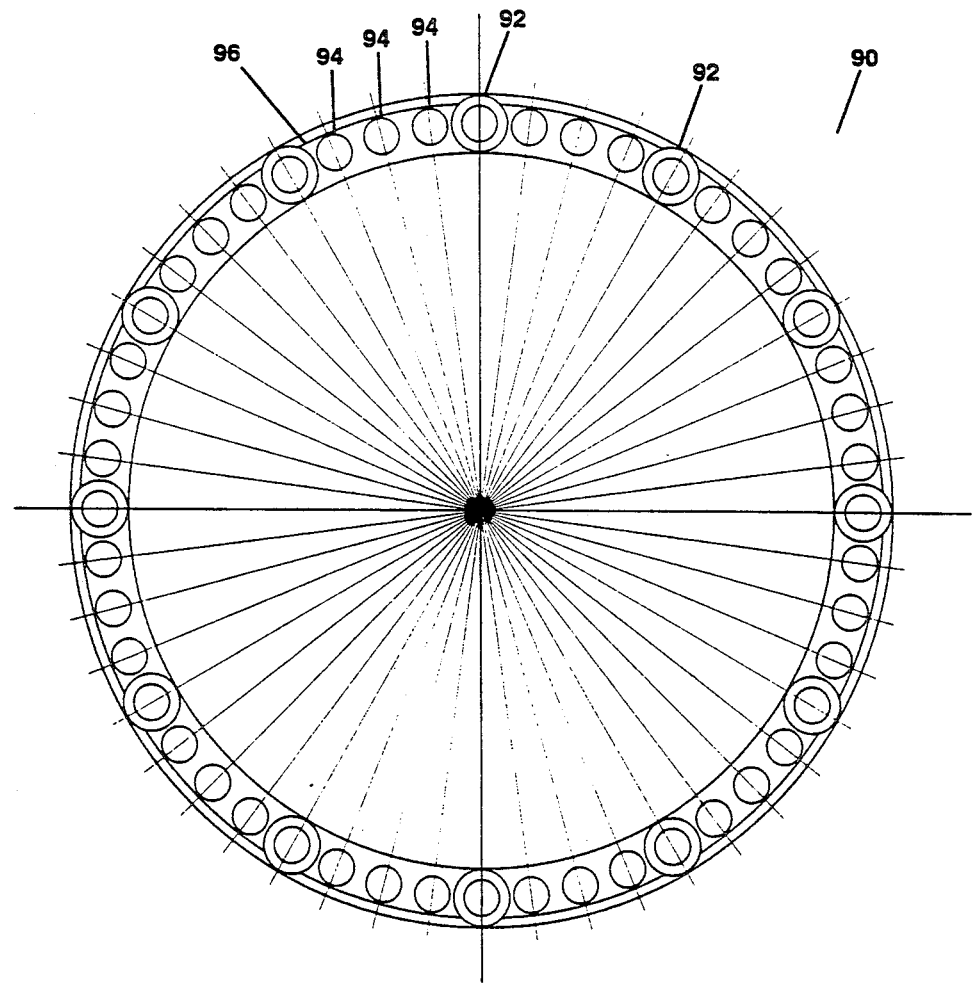
FIG. 7 shows a side view of an alternate compound bearing assembly.

FIG. 7 shows compound bearing assembly 90 in which compound bearing elements 92 are used in conjunction with ball elements 94. Ball elements 94 are caged by segments 96 to provide three balls, 94, per segment; although the number of balls is a matter of design choice taking into account the nature and magnitude of the loads applied to the assembly. Segments 96 are spaced between compound bearing elements 92 to provide compound bearing assembly 90, which is used where moment loads are less significant than radial or thrust loads.

Figure 8C:
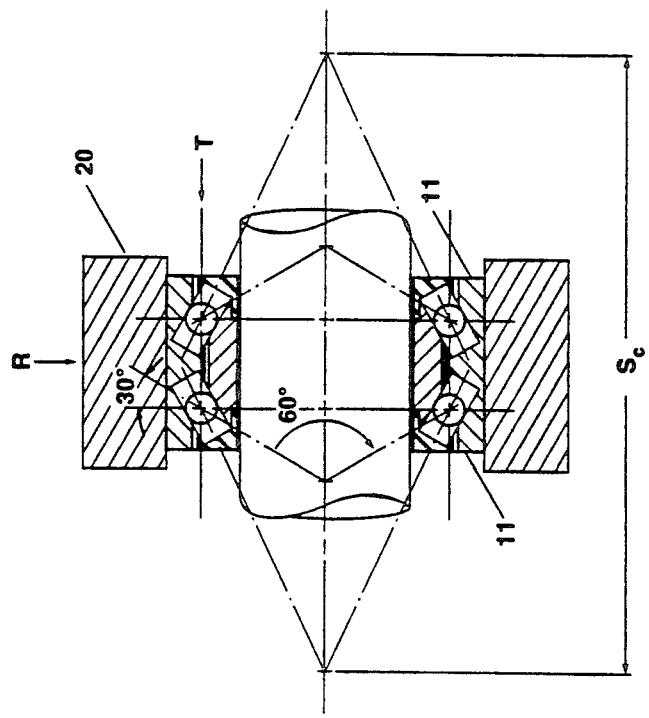
FIGS. 8A, 8B and 8C show bearing assemblies.
Figure 8B:
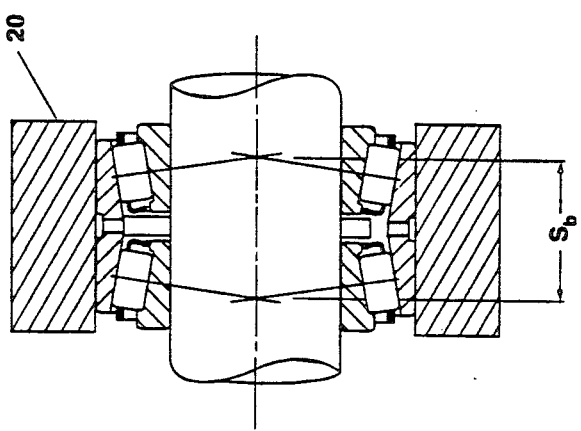
Figure 8A:
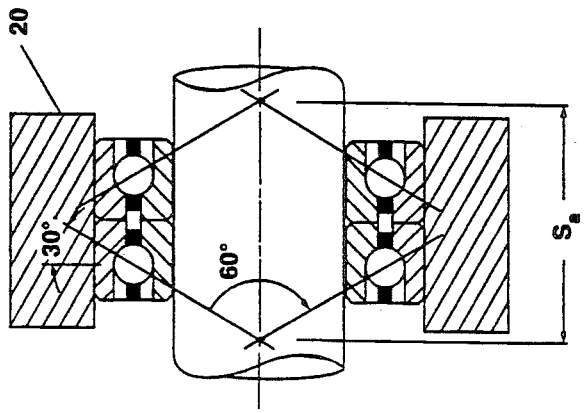

Referring to FIGS. 8A and 8B, wheel bearing assemblies that utilize prior art angular contact bearings (FIG. 8A) and tapered roller bearings (FIG. 8B) are shown. FIG. 8C shows a wheel assembly utilizing four-point-contact compound bearing elements bearing assembly. A significant load for bearing assemblies is the tilting forces of the wheel when turning, particularly at high speeds. The magnitudes of the bearing load is dependent upon the spread factor indicated as Sa, Sb and Sc on the three bearing assemblies of FIG. 2. The spread Sc of the compound element bearing is significantly larger (approximately 2.5 to 3.0) than Sa and Sb. This results in significantly smaller loads in the compound element bearing from the tilting forces, which results in a significantly longer life for the compound bearing assembly. A further consideration is the efficient utilization of contact angles in the compound element bearing design. In the wheel bearing assembly designs of FIG. 8, the contact angles are shown. Compound bearing assemblies 11 (FIG. 8C) allow the axle and the wheel assembly to rotate relative to the vehicle body structure 20. Compound bearing elements in both bearing assemblies 11 combine to accommodate the radial load (R) by the balls while the thrust (T) and moment (M) load are reacted by the rollers. The advantageous spread, F, of FIG. 8C decisively reduces the magnitude of the moment reaction force on the rollers. A small spread as in FIG. 8A and FIG. 8B adversely affects the bearing life as the loads imposed on the rolling elements are considerably higher.

Figure 9:
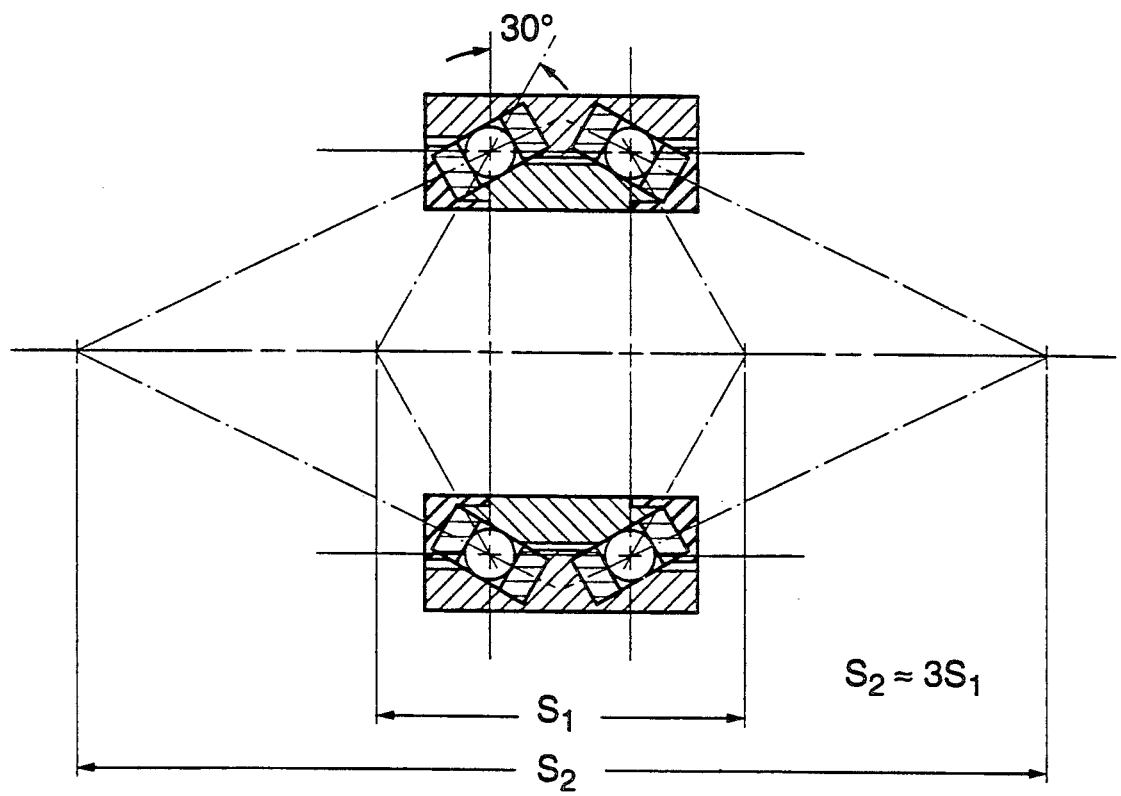
FIG. 9 shows a double row alternate compound bearing assembly.

Referring to FIG. 9, a double row compound element bearing assembly 100 is shown. With rollers removed, the assembly would be an angular contact bearing assembly having a spread $S_1$. Where spread S relates to the ability to react a given moment (i.e., the larger the spread, the lower the load required to react the given moment). An assembly having a compound element configuration as shown has a spread $S_2$. With a normal 30° contact angle for both configurations, $S_2$ is approximately three times greater than $S_1$. This results in a load for the compound element bearing that is about one-half load for the angular contact bearing. With one-half the load, one can achieve up to eight times the life. (Conservative for rollers Vcs.)

A further embodiment is shown in FIGS. 10A and 10B in which a plurality of alternating four-point-contact component bearing elements provide a bearing assembly with essentially six point contact (the six points of contact being labeled A, B, C, D, E and F). This configuration has a 0° contact angle for the balls at points A and C. The rollers are at proper contact angles and diameters so that contact points A, B and E are at contact pitch diameter $D_{RO}$ on the outer race and contact points C, D and F are at contact pitch diameter $D_{Ri}$ of the inner race. This geometry satisfies the kinematics of each compound bearing element and ensures equal velocity of the element and thus, prevents skidding. This configuration advantageously increases the capacity of the bearing assembly since the 0° contact angle directly applies the radial load to the balls, as in a pure radial bearing, and the cross rollers effectively react thrust and moment loading. The angle and number of alternating compound bearing elements may be varied depending upon the bearing application.

Referring to FIG. 11, a compound bearing element with a second roller superimposed over the first roller is shown. This multi-element assembly provides six points of contact for a bearing geometry that is efficient in sharing combined external forces as well as reacting them. Contact points D, E and F are in contact with outer race 16' at contact pitch diameter $D_{Ro}$ and contact points A, B and C are in contact with the inner race 14' at contact pitch diameter $D_{Ri}$. This configuration satisfies the kinematics of the compound bearing element, ensures equal angular velocity at the center of each element and, thus, prevents skidding. In this embodiment the radial load R is directly applied to the balls (0° contact angle) as in a pure radial bearing and the rollers effectively react the thrust (T) and moment (M) loads. Accordingly, the balls are not required to react moment loads. The angle and number of six-point contact elements may be varied depending upon the application. In this embodiment, the compound bearing element assembly is assembled by removing plug 120 from inner race 14' to provide an opening through which the bearing elements may be inserted.

Other embodiments are within the following claims.

What is claimed is:

1. A bearing assembly, configured to rotate about an axis and containing rolling elements between an inner and an outer race of a raceway, said assembly comprising a first rolling element of a first diameter, a second rolling element of a second diameter wherein said second diameter is greater than said first diameter, and a third rolling element of a third diameter, said rolling elements being oriented between said inner and outer races so that said first element contacts said inner race at a point lying on an inner pitch diameter and said outer race at a point lying on an outer pitch diameter, said second element contacts said inner race at a point lying on said inner pitch diameter and said outer race at a point lying on said outer pitch diameter, and said third element contacts said inner race at a point lying on said inner pitch diameter and said outer race at a point lying on said outer pitch diameter, wherein the contact points of each of said rolling elements with said inner and said outer races are different from the contact points of the other two of said rolling elements with said inner and said outer races, so that said first, said second, and said third rolling elements together make six-point contact with said races.

2. The assembly of claim 1 wherein said second rolling elements is superimposed over said first rolling element.

3. The bearing assembly of claim 1 wherein said third diameter is greater than said second diameter.

4. The bearing assembly of claim 3 wherein said third rolling element is superimposed over said second rolling element.

5. The bearing assembly of any one of claim 1–4 wherein said first rolling element is a ball.

6. The bearing assembly of any one of claims 1–4 wherein said second rolling element is a roller.

7. The bearing assembly of any one of claims 1–4 wherein said third rolling element is a roller.

8. The bearing assembly of claim 1 wherein each said rolling element is configured to carry a load.

* * * * *